United States Patent [19]
Yuryan

[11] 3,805,944
[45] Apr. 23, 1974

[54] AUTOMATIC LOADER FOR BROACHING MACHINES
[75] Inventor: Joseph B. Yuryan, Hudson, Mass.
[73] Assignee: The Lapointe Machine Tool Company, Hudson, Mass.
[22] Filed: Feb. 10, 1972
[21] Appl. No.: 225,090

[52] U.S. Cl. ............... 198/20 R, 198/21, 198/26, 214/1 BB
[51] Int. Cl. ............................................ B65g 47/00
[58] Field of Search ........ 198/20, 26, 21; 214/1 BB; 294/106

[56] References Cited
UNITED STATES PATENTS

| | | | |
|---|---|---|---|
| 3,659,693 | 5/1972 | Muller | 198/20 R |
| 3,587,822 | 6/1971 | White | 198/26 |
| 2,525,572 | 10/1950 | Woody et al. | 214/1 BB |
| 3,545,589 | 12/1970 | Keller | 198/26 |
| 3,263,535 | 8/1966 | Zurcher | 294/106 |
| 2,709,013 | 5/1955 | Hartzog | 198/26 |
| 3,160,259 | 12/1964 | Dalton | 198/21 |

Primary Examiner—James B. Marbert
Assistant Examiner—Joseph E. Valenza
Attorney, Agent, or Firm—Robert T. Gammons; Dike, Bronstein, Roberts & Cushman

[57] ABSTRACT

An automatic loader for depositing parts in work holders mounted on a movable support for movement continuously and in succession relative to a station at which operations are to be performed on the parts while held by said work holders, comprising instrumentalities for receiving parts to be operated upon, move them in synchronism with the respective work holders and while so moving them deposit them in the work holders. Following deposit of each part the instrumentalities are returned to their initial positions for receiving a succeeding part. The loader is controlled by programming to operate cyclically once its operation at any stage of operation in a cycle of operation in the event that a part is not present, and there are safety releases operable under pressure or jamming of any parts during the operation to stop the loader.

9 Claims, 20 Drawing Figures

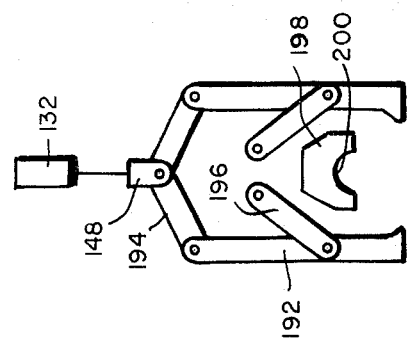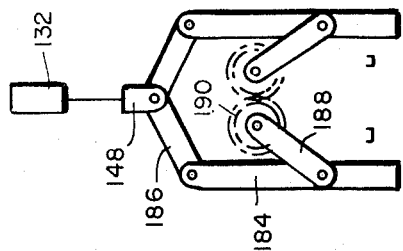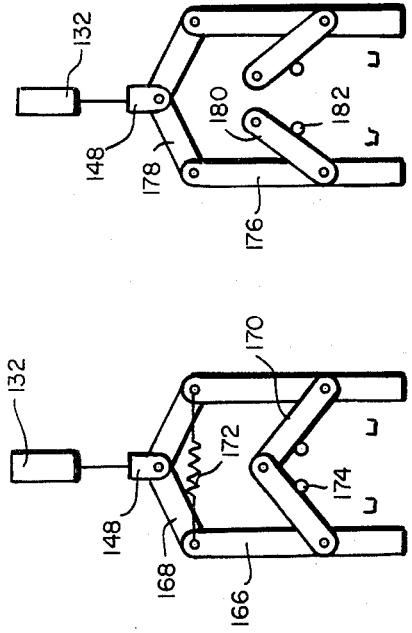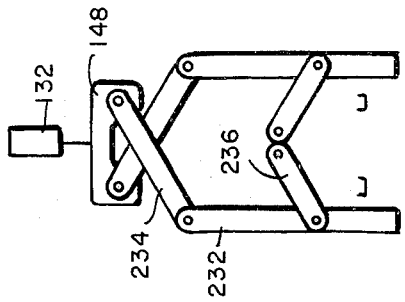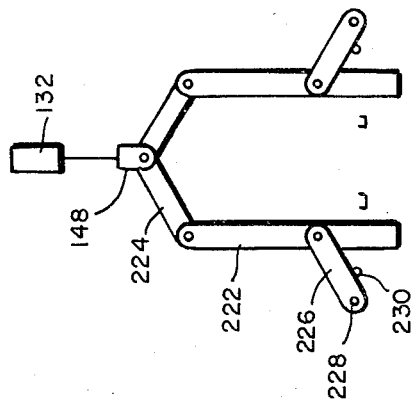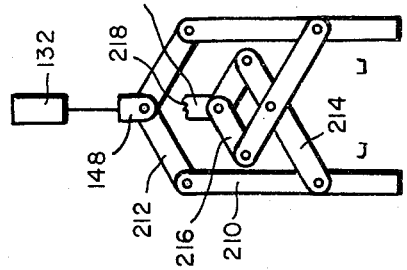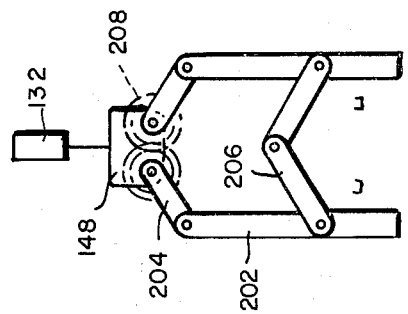

AUTOMATIC LOADER FOR BROACHING MACHINES

BACKGROUND OF THE INVENTION

The use of conveyors provided with work holders for receiving and moving parts to a broaching machine and for holding the parts during the broaching operation as well as for other kinds of machining operations are known. Conveyors of this kind are generally loaded by a helper who stands at one end of the conveyor and as often as a work holder moves into position picks up the part to be operated upon and inserts it into the work holder. Such manual loading is extremely tedious and is an inefficient use of manpower. This invention relates to an automatic loader for eliminating manual disposition of the parts to be operated upon in the work holders. Further objects are to provide an apparatus for precision loading of the parts to be processed; to provide apparatus for loading while on the move and hence maximum capacity; to provide apparatus embodying release means for minimizing damage by reason of accidental lock-up between the parts and the travelling components of the loader; to provide apparatus which can be used not only to load but to unload the parts following processing; and to provide apparatus which can be quickly converted from automatic to manual use.

SUMMARY

As herein illustrated, the loader is designed for depositing parts in work holders mounted on a movable support for movement continuously and in succession relative to a station at which operations are performed on the parts while held by the work holders, comprising a stationary support adjacent the movable support relative to which the movable support travels, a picker at the stationary support adapted to pick up a part therefrom, means for effecting forward movement of the picker with a work holder on the movable support each time the work holder arrives at the stationary support a predetermined distance and then to return to said stationary support in time to be moved forwardly with the succeeding work holder, and means for causing the picker to deposit the part held thereby in the work holder during the forward movement. Means is provided for gravitationally delivering the parts to the stationary support in the form of an inclined chute supported with its lower end at the level of the stationary support. There is means opposite the lower end of the chute for stopping the parts gravitationally delivered onto the stationary support and means on the stationary support in the form of a reciprocal feeder operable to move the parts delivered thereto forwardly to the picker. There is means for guiding the parts during said forward movement and for stopping the foremost part in a position to be picked up by the picker. The picker is supported for reciprocal movement perpendicularly to the stationary support and is operable to pick up a part from the work support and dispose it in a predetermined oriented position with respect to the work holders.

There is means associated with the picker operable following lifting a part from the work support in the form of a plunger movable into engagement with members on the work holders to effect forward movement of the picker in consonance with the work holders, and means operable during said forward movement to cause the picker to deposit a part in the work holder. Following deposit of a part in the work holder the picker is returned to its initial position for receiving the next succeeding part. There is a presser foot situated beyond the place of deposit of the parts in the work holders operable by engagement with the parts as they pass therebeneath to press them into the work holders and beyond the presser foot a gauge member through which the parts pass operable in the event of misalignment to stop the loader. The foregoing instrumentalities comprising the feed chute, the reciprocal feeder and picker, including the stationary work support are supported by a frame member pivoted at its forward end with respect to the direction of the movable support to be moved upwardly away from the movable support in the event of jamming of a part between the work holders and the instrumentalities and/or to enable purposely lifting the instrumentalities from the movable work support to permit it to be manually loaded if desired. There is a carriage for moving the picker forwardly with the movable support on which the plunger for engagement with the movable support is pivotally mounted. A pivoted support mounted on the carriage and held at a predetermined position by yieldably interengaged blocks normally holds the picker and plunger in a vertically disposed position for engagement of the plunger with the members on successive work holders and movement of the picker toward the work holders to deposit parts in the work holders. In the event of excessive resistance to movement of the picker with a work holder the interengaged block becomes disengaged to permit the pivoted support to swing away from the work holder and thus to disengage the plunger from the member on the work holder.

The invention will now be described in greater detail with reference to the accompanying drawings wherein.

Figure 5:
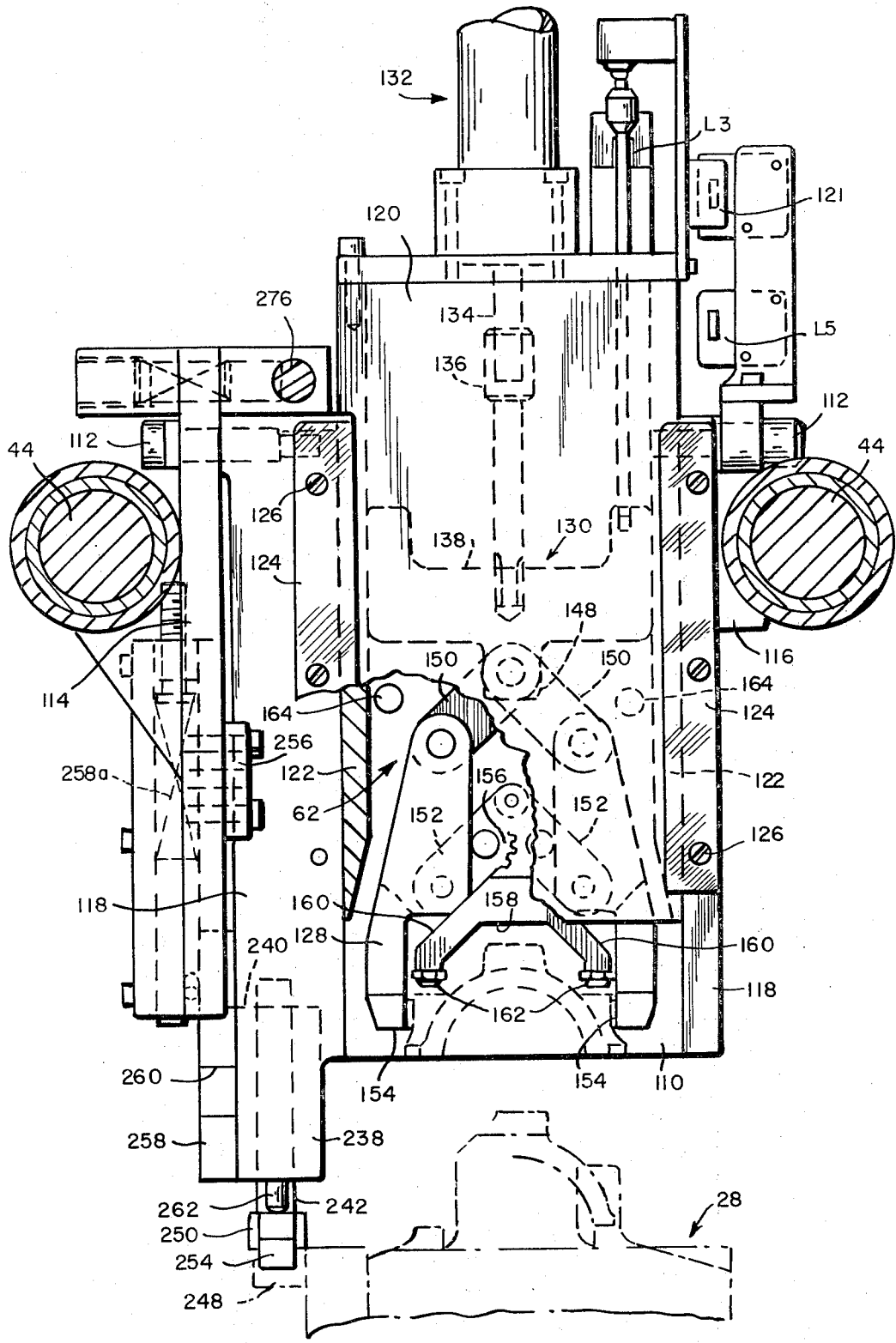
FIG. 5 is an elevation, partly in section, taken on the line 5—5 of FIG. 1.

FIGS. 9, 10, 11 and 12 diagrammatically illustrate the operation of the picker fingers as disclosed in FIG. 5; and FIGS. 13 to 20, inclusive, diagrammatically illustrate alternative forms of picker fingers.

Referring to the drawings (FIGS. 1 and 2), the loader 10 is shown mounted above a conveyor 12 for depositing parts in work holders 14 mounted on the conveyor for movement along a predetermined path relative to a station A at which operations are to be performed on the parts while held in the work holders such, for example, as broaching operations or machining operations. It is to be understood, however, that the loader may be used for depositing parts in work holders for other purposes or solely for the purpose of transporting the parts from one place to another.

Figure 1:
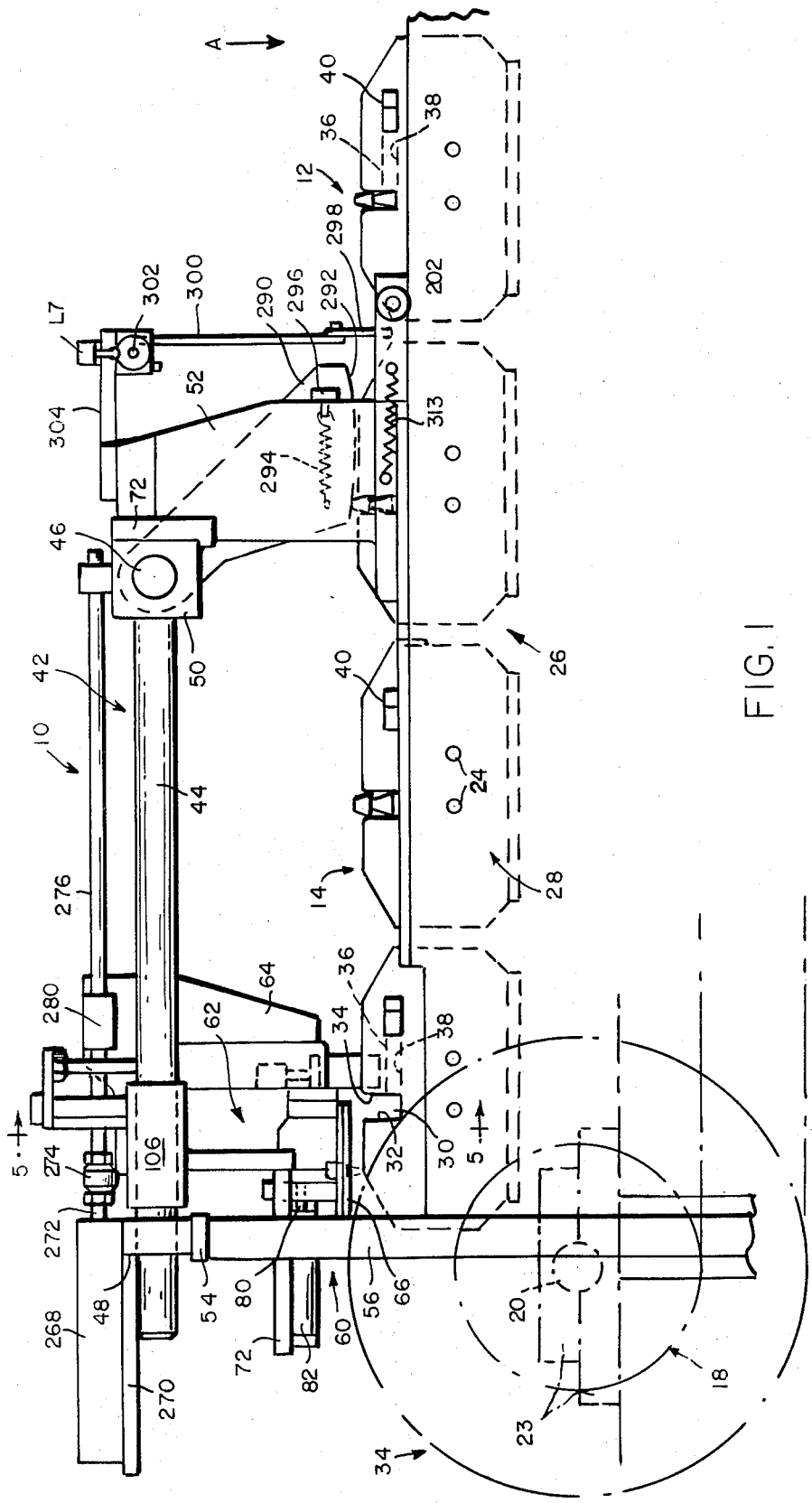
FIG. 1 is an elevation of the loader as seen from one side of the apparatus in its association with the conveyor.

The conveyor herein illustrated comprises spaced parallel chains 16—16 (FIG. 2) entrained about sprockets 18—18 supported on horizontal shafts 20—20 mounted at the opposite ends of a base frame 22 in suitable bearings 23, one of the shafts 20 being adapted to be connected to a drive motor (not shown) by means of which the conveyor may be driven continuously. The work holders 14 are mounted on the conveyor between the chains at uniformly spaced intervals by pins 24—24. As thus constructed, the conveyor has an upper horizontal run 26 along which the work holders travel from the left end toward the right, as illustrated in FIG. 1. The parts are deposited in the work holders near the left end, are moved toward the right end to and through the station A where they are operated upon, and from thence to the right end where they are mechanically removed from the work holders or gravitationally discharged therefrom.

Each work holder 14 comprises a block 28 (FIG. 1) containing a recess 30 into which a part is adapted to be deposited, having fixed and movable sides 32, 34, the movable side being adapted to be pressed against a part in the recess to clamp the part against the fixed side. As illustrated, the movable side is constituted by one end of a ram 36 mounted in a suitable longitudinally disposed passage 38 in the block for movement longitudinally therein. A cam bar 40 is mounted in a transverse passage in the block which intersects the longitudinal passage for engagement with the other end of the ram so that by movement of the cam bar transversely with respect to the ram the latter may be forced against the part in the recess to clamp the part or retracted to release the part.

The loader 10 is supported above the horizontal run of the conveyor near the left end on a pivotally supported rigid frame 42 comprising longitudinally extending, spaced parallel shafts 44—44 connected at one end to a transverse shaft 46 and at their opposite ends to a transverse beam 48. The transverse shaft 46 is journaled at its opposite ends in bearing blocks 50—50 at the upper ends of stanchions 52—52 which are secured to the base of the conveyor. The beam 48 rests on caps 54—54 at the upper ends of posts 56—56 secured to the base. As thus constructed, the frame is supported in a horizontal position above and parallel to the upper run of the conveyor upon the caps 54—54 by the gravitational effect of its weight and that of the loading instrumentalities but may be moved upwardly relative to the conveyor by swinging it upwardly about the axis of the shaft 46. The frame is stationary relative to the conveyor under normal operating conditions but may be lifted away from the conveyor when the occasion arises.

The frame 42 supports the instrumentalities comprising the loader adjacent the upper run of the conveyor and these instrumentalities comprise a stationary part support 58 (FIGS. 2, 3 and 6) on which parts are adapted to be deposited, a feeder 60 for moving the parts on the stationary support forwardly, a picker 62 for picking up parts from the stationary support and depositing them in the respective work holders, and a carriage 64 for effecting movement of the picker with and relative to the conveyor.

Figure 3:
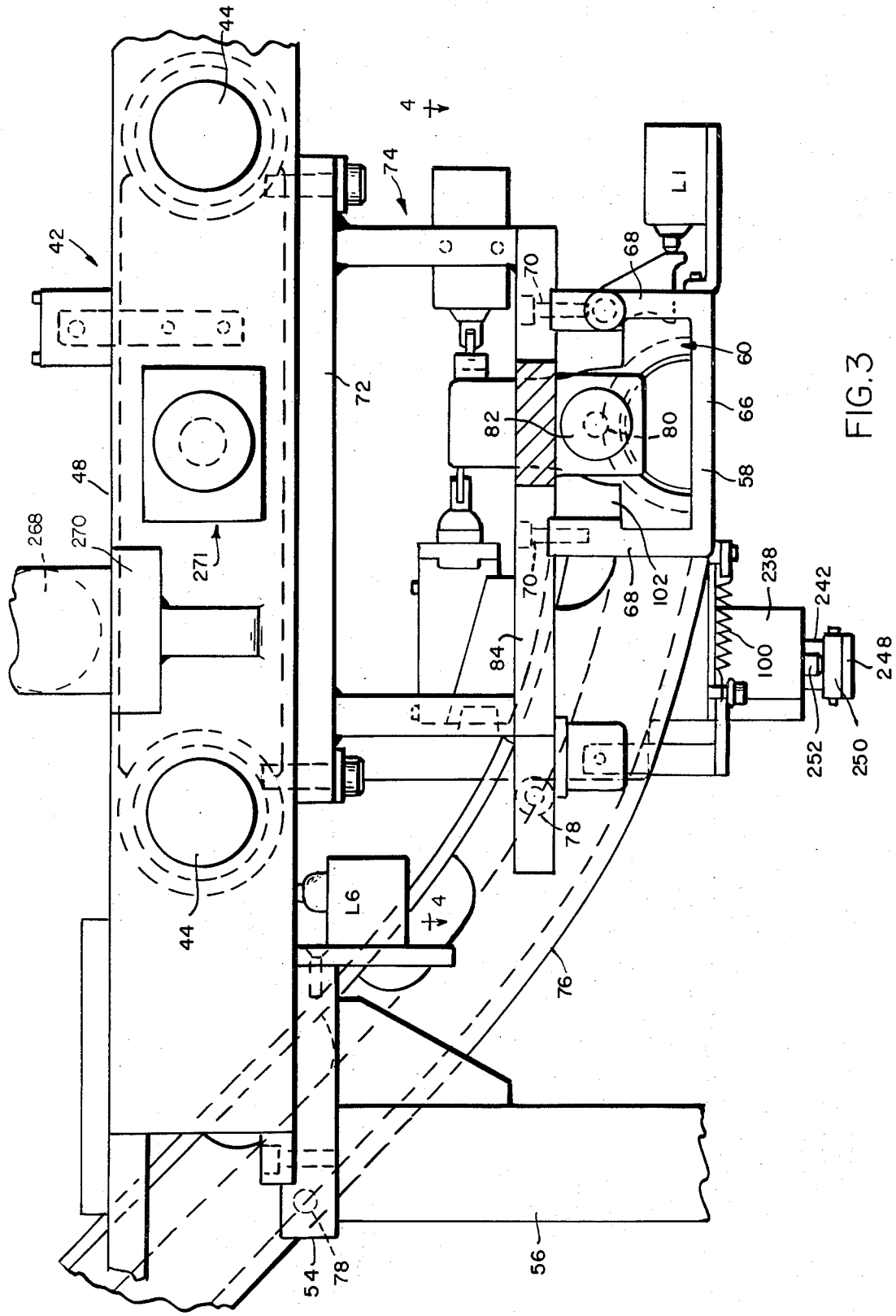
FIG. 3 is a fragmentary elevation, to much larger scale, of that portion of the loader at the left end of the apparatus as seen in FIG. 1, located above the conveyor.

The part support 58 comprises a platform 66 having transversely spaced side walls 68—68 (FIG. 3), the upper edges of which are attached by bolts 70 to a horizontal plate 72, the latter comprising part of a depending bracket 74 bolted to the underside of the beam 48. The wall 68 at the right side of the platform constitutes a stop opposite the delivery end of a chute 76 mounted on the frame for gravitationally delivering parts onto the platform 66 at a position such that they are symmetrically disposed thereon with respect to the feeding means which will be described hereinafter. The pressure of successive parts in the chute holds the part on the platform firmly against the wall 68. The chute 76, as shown in FIG. 3, is fastened to the frame by bolts 78 and has a cross-section adapted to guide the parts downwardly from a hopper (not shown) in the proper position for disposition on the platform.

The feeder 60 is mounted on the upper side of the platform between the side walls 68—68 for reciprocal movement and is connected for this purpose to the forward end of a piston rod 80 (FIG. 6) projecting through the forward end of a cylinder 82 bolted to the underside of the plate 72. The feeder is guided in its reciprocal movement between the side walls 68—68 on longitudinally spaced guides 84, 86 (FIG. 6) having arcuate upper surfaces 88, 90 on which the feeder straddles. The space between the guides provides a transverse slot 92 on the platform into which a part gravitates from the chute. A detector bar 94 (FIG. 4) is pivotally supported at the left side of the platform on a pivot pin 96 with an end 98 situated at the place where the part is to be picked up. A spring 100 biases the end 98 inwardly from the side wall 68 and if there is no part at this position such inward displacement actuates a limit switch L2 (FIG. 4) by way of an arm 102 integral with the bar to prevent further operation of the loader until a part is delivered to this position.

Figure 6:
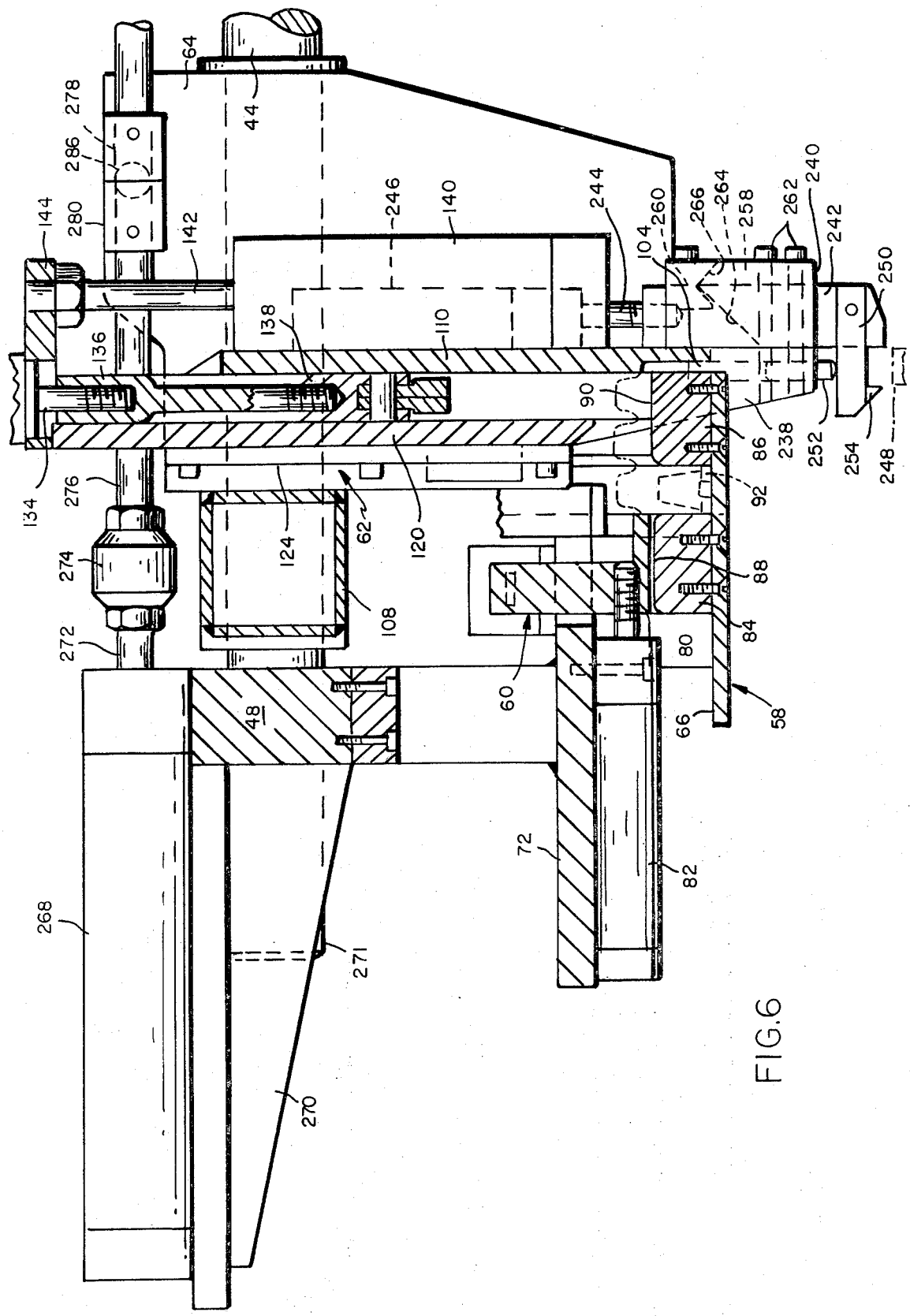
FIG. 6 is a vertical section taken on the line 6—6 of FIG. 5.

Forward movement of the part on the platform is limited by engagement with a vertically disposed plate 104 (FIG. 6) fixed to the forward end of the guide 86. As shown in FIG. 6 the distance between the place of delivery of a part to the platform and the place of pick-off is such that there are three parts resting on the platform, one at the place of delivery, one at the place of pick-off and an intermediate part.

Figure 7:
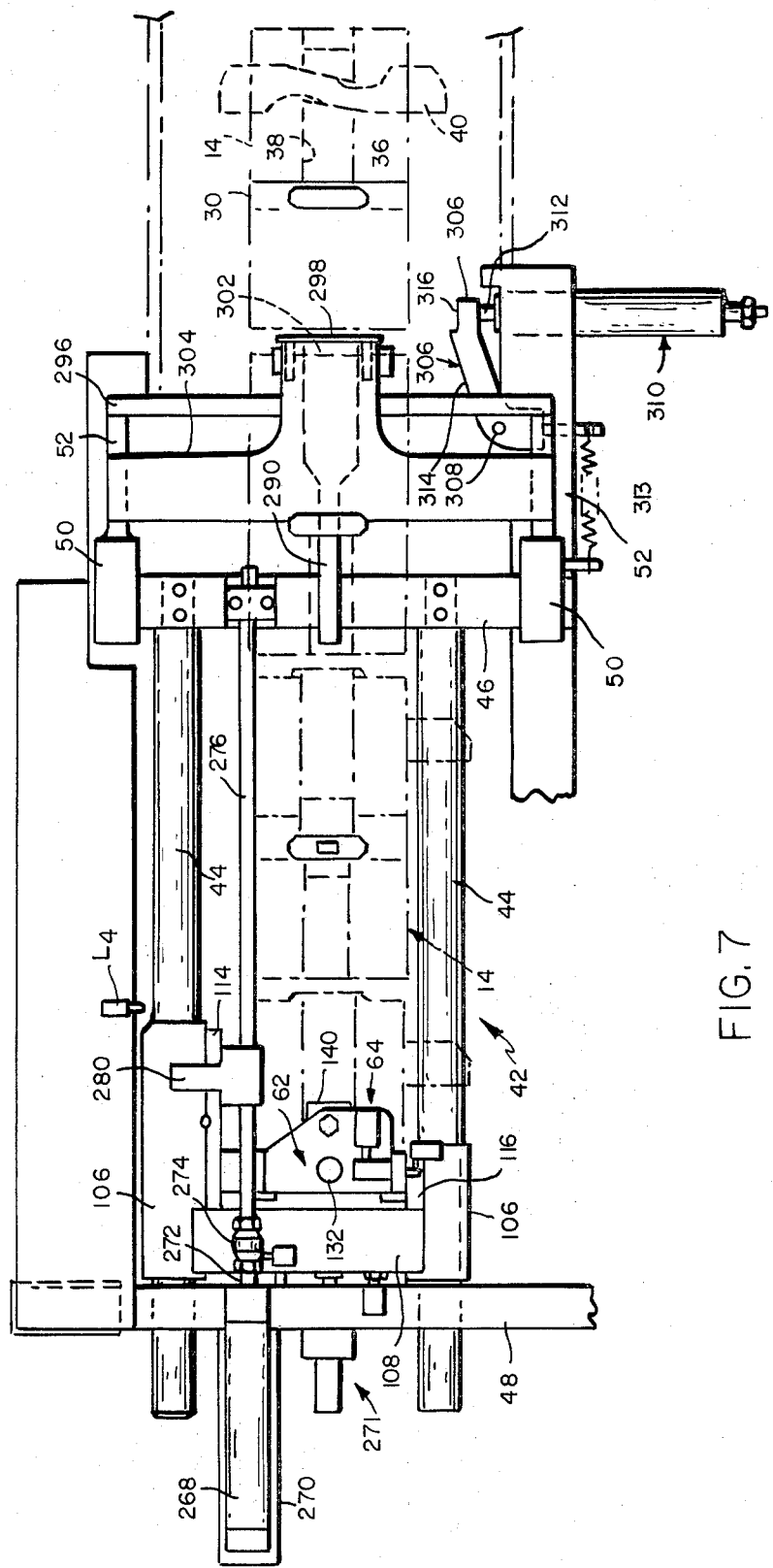
FIG. 7 is a plan view of the loader.
Figure 8:
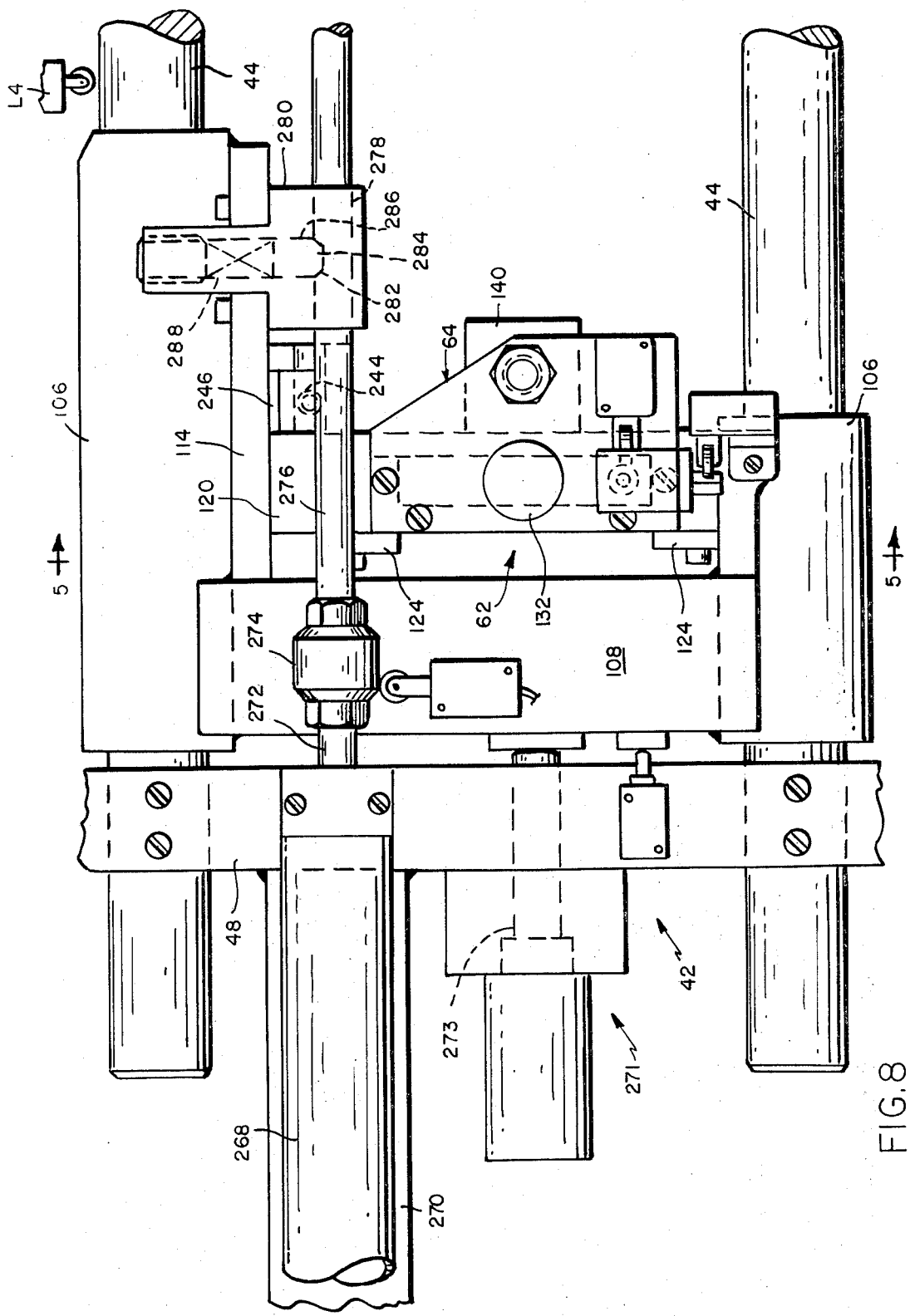
FIG. 8 is a fragmentary plan view, to much larger scale, showing the carriage at its retracted position.
Figure 9:
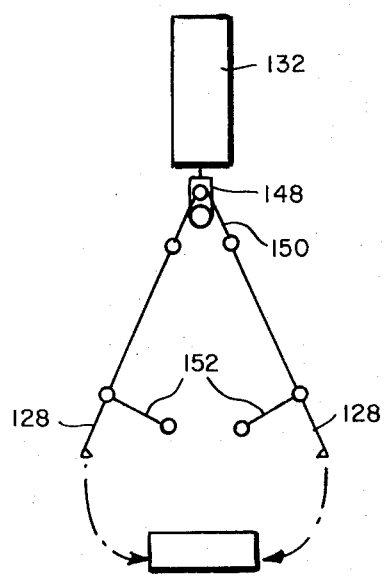
Figure 10:
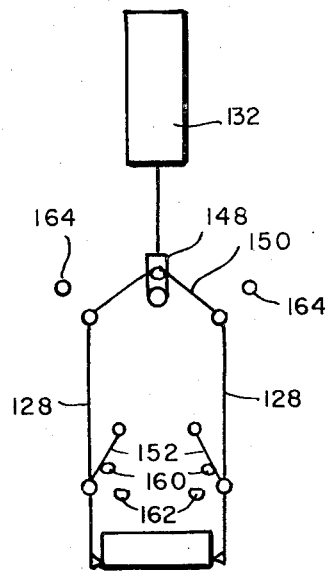
Figure 11:
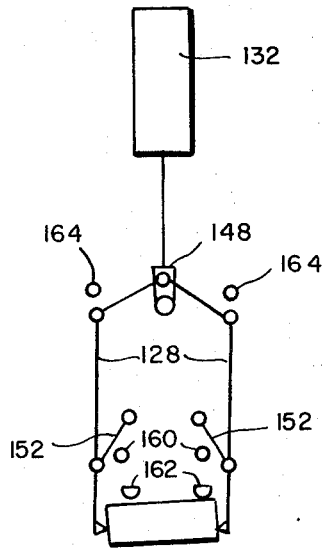
Figure 12:
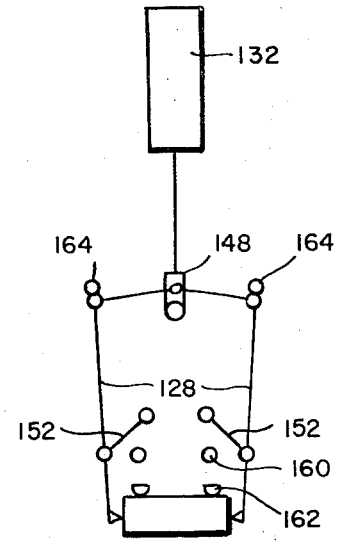

The picker 62 (FIGS. 5 and 6) is supported by the carriage 64 for reciprocal movement on the shafts 44—44. The carriage 64 is comprised of sleeves 106—106 (FIGS. 7 and 8) slidably mounted on the shafts 44—44 rigidly connected to each other by a transversely extending beam 108. The picker 62 is mounted on the carriage 64 for movement with the carriage on a vertically disposed plate 110 (FIG. 6) pivotally supported at its upper end (FIG. 5) for angular movement about a horizontal axis transverse to the direction of movement of the conveyor on trunnions 112—112 supported between members 114, 116 welded to the sleeves. The plate 110 has transversely spaced, rearwardly extending side walls 118—118, forming with the plate 110 a U-shaped, vertically disposed way in which is slidably mounted a slide plate 120 having spaced parallel, forwardly extending flanges 122—122 which fit within the side walls 118—118. Gibs 124—124 fastened to the edges of the side walls 118—118 by screw bolts 126 hold the slide plate 120 in the way. The picker 62 comprising the clamp fingers 128—128 and a support 130 therefor is mounted on the slide plate 120 for vertical movement relative to the plate 110 and the carriage 64. Vertical movement of the picker 62 relative to the plate 120 is effected by a piston and cylinder assembly 132 mounted at the top of the slide plate 120 and is provided with a downwardly extending rod 134 threaded into the upper end of a coupling 136, the lower end of which is threaded into a yoke 138 (FIGS. 5 and 6) which supports the picker clamp fingers. Vertical movement of the picker and slide plate 120 relative to the plate 110 is effected by a cylinder and piston assembly 140 bolted to the plate 110 which has a piston rod 142 projecting from its upper end, the upper end of which is connected to a horizontal bracket plate 144 secured to the top of the slide plate 120. The aforesaid construction permits the picker clamp fingers to be raised from the part platform when the carriage is at the retracted position to close the picker clamp fingers on a part and lift the part away from the platform for movement forwardly with the carriage so as to clear the platform and to be moved downwardly to force the part held thereby into a work holder on the conveyor.

The picker 62 may take various forms which will depend to some extent upon the geometry of the part which is being processed. In FIG. 5 the picker comprises the yoke 138 connected to the lower end of the coupling 136 and a depending lug 148 pivotally supporting the picker linkage which comprises two links 150—150 and two links 152—152 pivotally connecting the clamp fingers 128—128. The links 150—150 are pivotally connected at their upper ends to the lug 148 and at their lower ends to the clamp fingers 128—128. The links 152—152 are pivotally connected to each other on an axis situated below the pivoted upper ends of the clamp fingers and at their lower ends to the clamp fingers intermediate their ends. The lower ends of the clamp fingers 128—128 have confronting sides which are adapted to be brought into engagement with the part to be picked up and are provided with pads 154—154 fixed thereto for engagement with the part to be picked up and are comprised of frictional material. A pair of gear sectors 156—156 are mounted on the links 152—152 intermediate their ends in mesh with each other. Downward movement of the piston in the cylinder 132 through the coupling 136 moves the yoke 138 and hence the linkage comprising the links 152—152, clamp fingers 128—128 and links 154—154 downwardly at a spacing such as to clear the opposite ends of the part resting on the part support and to bring the links 154—154 into engagement with a fixed stop 158 having downwardly divergent surfaces 160—160. Engagement of the links 152—152 with the fixed stop 158 limits downward movement so that further downward movement of the yoke 138 causes the clamp fingers 128—128 to pivot at the ends of the links 152—152 into engagement with the part. The stop 158 embodies a pair of transversely spaced fixed locating members 162—162 situated above the part support and as the clamp fingers are lifted they raise the part into engagement with the locating members 162—162 so as to properly position the part for later disposition in the work support (FIG. 5), even though the initial grasp is somewhat uneven. The retractile capacity of the linkage is important because it guarantees an exact relationship between the part and the locating members on the travelling work holders. A pair of stops 164—164 engaged by the clamp fingers 128—128, as they are raised from the work support, limit the upward rise, and therefore end the amount of lifting or "stripping" action of the clamp fingers relative to the part and continuing pressure from cylinder 132 holds the part firmly against the positioning members. The upward movement to effect such clamping is determined by the proportions of the linkage and the nature of the part. Following clamping the picker is moved forwardly with the carriage to a position to clear the part platform whereupon the picker is moved downwardly to deposit the part in a work holder and release the part. FIGS. 9 to 12 inclusive diagrammatically illustrate the linkage shown in FIG. 5 described above.

Several different forms of picker linkage are shown in FIGS. 13 to 20 inclusive, which are considered basic. The rectractile capability of the illustrated structure is an important feature in that it guarantees an exact relationship between the part being handled and the locating surfaces on the work holders. The several linkages disclosed are designed to approach in performance some of the faculties and dexterity of the human hand. Some variations provide for more effective or increased amounts of lift while others provide for self-centering of the clamp fingers.

All of the linkages are supported above the part on the work support and gravity therefor affects the linkage in a direction which assists in closing action of the clamping fingers upon the part. The limit stops shown restrict the downward motion of the links and produce an initial centering of the clamping fingers at the beginning of the lifting operation and the limiting members insure orientation of the clamp parts for proper disposition in the work holders. If the linkage were to be used in an inverted manner the effects of gravity could be counteracted by use of suitable springs.

Referring specifically to the several kinds of linkage which may be used, FIG. 13 comprises clamp fingers 166—166 connected at their upper ends to the lug 148 by links 168—168 and intermediate their ends by links 170—170. A tension spring 172 is connected between the upper ends of the clamp fingers 166—166 and stops 174—174 are provided below the links 170—170.

In FIG. 14 the clamp fingers 176—176 are connected to the lug 148 by links 178—178 and intermediate their ends by links 180—180. The links 180—180 are pivotally mounted independently of each other. Stops 182—182 are provided below the links 180—180.

In FIG. 15 the clamp fingers 184—184 are connected by links 186—186 to the lug 148 and intermediate their ends to links 188—188, which have at their adjacent ends intermeshing gear sectors 190—190. This construction keeps the gripper fingers 184 and the part they grasp, centered about a vertical centerline through the linkage.

In FIG. 16 the clamp fingers 192—192 are connected by links 194—194 to the lug 148 and intermediate their ends by links 196—196. A locating saddle 198 is designed especially for a part having a curved surface and is provided with a concave bearing surface 200 for this purpose. The center-line of links 192 and the part is therefore established by locating saddle 198.

FIG. 17 shows clamp fingers 202—202 connected by links 204—204 and intermediate their ends by links 206—206. The links 204—204 have at their adjacent ends intermeshing gear sectors 208—208 for the purpose of keeping the linkage centered about a vertical center-line.

FIG. 18 shows clamp fingers 210—210 connected by links 212—212 to the lug 148 and intermediate their ends by cross-links 214—214 which in turn are connected by links 216—216 to a vertically slidable part 218 movable in a fixed guide 220 for the same purpose of keeping the linkage centered about a vertical center-line.

FIG. 19 shows clamp fingers 222—222 connected by links 224—224 to the lug 148 and intermediate their ends to links 226—226 pivoted at 228—228. The links 226—226 extend outwardly from the clamp fingers 222—222 and ride on fixed stops 230—230 situated below them.

FIG. 20 shows clamp fingers 232—232 connected by cross-links 234—234 to the lug 148 and intermediate their ends by links 236—236.

The various linkages operate substantially in the same way and hence a detailed description of the operation of each linkage is not considered necessary.

After clamping of a part the carriage 14 is moved forwardly in consonance with the conveyor. To effect such forward movement the plate 110 is provided with an extension 238 (FIG. 5) to which there is fastened a block 240 in which there is supported for vertical movement a plunger 242. The plunger 242 is connected at its upper end to the lower end of a piston rod 244 projecting from the lower end of a cylinder 246 bolted to the extension 238 by means of which the plunger 242 is projected downwardly to the level of the upper run of the conveyor. A block 248 is fastened to each work holder so that as the work holders move beneath the loader the block 248 will engage the lower end of the plunger 242 and move the carriage forwardly. A latch bar 250 is pivotally mounted at the lower end of the plunger 242 and is biased downwardly by a spring-pressed pin 252 mounted on the extension 238. A toe 254 at the distal end of the latch bar serves to raise the latch bar as the block moves into engagement with it to permit the block to enter between the toe 254 and the rear side of the plunger and thus interconnect the carriage and the conveyor.

As was related above the plate 110 is pivotally mounted on horizontal trunnions 112—112 and is held in its vertically disposed position against a stop 256 (FIG. 5) by interengagement of blocks 258, 260 (FIG. 6). The block 258 is fastened to the block 240 and has an upwardly peaked tooth 264 which is engaged with a V-shaped recess 266 in the block 260. The block 260 is mounted in a vertically disposed slideway above the block 258 and is held yieldably engaged therewith by a spring 258a. As thus constructed if after the latch 250 engages a block 248 and for some reason or other the carriage will not move forwardly with the conveyor, forward pressure at the lower end of the plunger bar 242 will disengage the block 260 from the block 258, allowing the plate 110 to swing forwardly relative to the slide member 114 which, in turn, allows the block 248 on the conveyor to move forwardly beneath the lower end of the plunger 242.

Assuming that there is nothing preventing forward movement of the carriage with the conveyor as the latter moves forwardly, the slide plate 120 and picker 62 are moved downwardly by means of the cylinder 140 to force the part held in the picker fingers into the work holder, whereupon the picker fingers are caused to release the part, the slide plate 120 and picker 62 are raised and the carriage 64 is returned to its initial position.

Retraction of the carriage 64 is effected by a piston and cylinder assembly 268 supported in a horizontal position on a bracket 270 fastened to the member 48, provided with a piston rod 272. The piston rod 272 is connected by a coupling 274 to a rod 276 which extends forwardly through an opening 278 in a block 280 bolted to the carriage member 114. The rod 276 contains a beveled recess 282 within which there is held the beveled end 284 of a spring-pressed plunger 286, the latter being mounted in an opening 288 in the block situated at right angles to the opening 278. The recess and plunger provide a release coupling which will permit the rod 276 to be moved relative to the carriage in the event that the latter is prevented from moving or is moved forwardly by the conveyor beyond the extent of movement determined by the stroke of the piston in the piston and cylinder assembly. A bumper 271 (FIG. 8) comprising a spring-backed rod 273 is mounted in the beam 48 to bring the carriage to a stop as it is retracted.

If for some reason a part is not discharged from a work holder, that is, is carried around thereby to the loading end of the conveyor, jamming is automatically taken care of by the fact that the auxiliary frame 42 is pivotally supported at its forward end in respect to the direction of movement of the conveyor and so the upward movement of the part with the conveyor as it travels upwardly along the curved run at the left end of the conveyor, as viewed in FIG. 1, toward the auxiliary frame will exert pressure upwardly to lift it about the axis of the shaft 46. A limit switch L6 is provided which is operable by such upward movement to stop the loader thereby to enable the operator to remove the offending part.

As the part moves forwardly from the work holder after having been released by the picker final exact location for clamping up is accomplished by pressing the part downwardly into the work holder against a locating member situated therein by a presser foot 290 (FIG. 1) pivotally supported on the shaft 46 above the conveyor which has a lower surface 292 substantially parallel to the conveyor situated at such a level as to force a part which is carried forwardly by the conveyor beneath it into the work holder. The presser foot 290 is biased downwardly by a spring 294 and is provided with a stop 296 which, by engagement with the stanchions 52—52, limit its lowermost position. Optionally, the clamping fingers may be employed to hold the part in its exact location in space within the work holder for clamping in that position.

Just beyond the presser foot 290 there is a gauge plate 298 supported at the lower end of a bar 300, the upper end of which is pivoted at 302 to the forward end of a bracket plate 304. The gauge plate is shaped to the contour of the part and if the latter is not seated properly, either laterally or heightwise, it will deflect the gauge plate 292, swinging it forwardly. Such forward movement will operate a limit switch L7 to stop the loader. If the part passes through the gauge plate 292 it is now rigidly clamped in the work holder by the cam bar 40 which, as previously related, is arranged transversely of the work holder and which is operable by transverse movement to apply longitudinal movement to the ram 36, one end of which enters the slot 30 in the work holder so as to apply clamping pressure to the part. Transverse movement of the cam bar 40 is effected by an impact hammer 306 (FIG. 7) pivotally supported at 308 on the frame alongside the conveyor, the impact of which is effected by a spring-pressed piston and cylinder assembly 310 from which projects a rod 312 which is adapted to drive the hammer against the end of the cam bar 40. The hammer 306 is cocked by movement of the end of the cam bar 40 along a converging cam surface 314 and is released to apply impact to the end of the cam bar by a notch 316 at the end of the cam surface. The hammer is held against the rod 312 by a spring 313.

The part now being rigidly clamped in the work holder moves forwardly on the conveyor for the broaching operation at the station A. Following the broaching operation the part is released by an unlocking cam plate mounted on the opposite side of the conveyor which drives the cam bar in the opposite direction to unclamp the part. The unclamped part may be discharged gravitationally as it is carried over the end of the conveyor at the right end onto an inclined chute. Alternatively, the part may be mechanically picked out of the work holder by a picker similar to that which was employed as heretofore described to load the parts into the work holders.

The loader is programmed to operate cyclically and limit switches are provided which are operative in the absence of a part at a specific place at the right time in a cycle of operations or the failure of a component of the loader mechanism to be in its proper relation to other components to stop the loader.

In the normal cycle the feeder advances a part to the picker, the picker picks it up from the work support, the plunger is moved downwardly to engage a block on the conveyor, the carriage is moved forwardly by engagement of the plunger with the block in synchronism with the conveyor, the picker is moved down to press a part into a work holder on the conveyor and is caused to release the part and to be elevated and the conveyor is retracted to complete the cycle. Throughout the cycle each component of the mechanism, after having performed its function, moves back to its initial position in readiness for the next cycle of operation.

Figure 4:
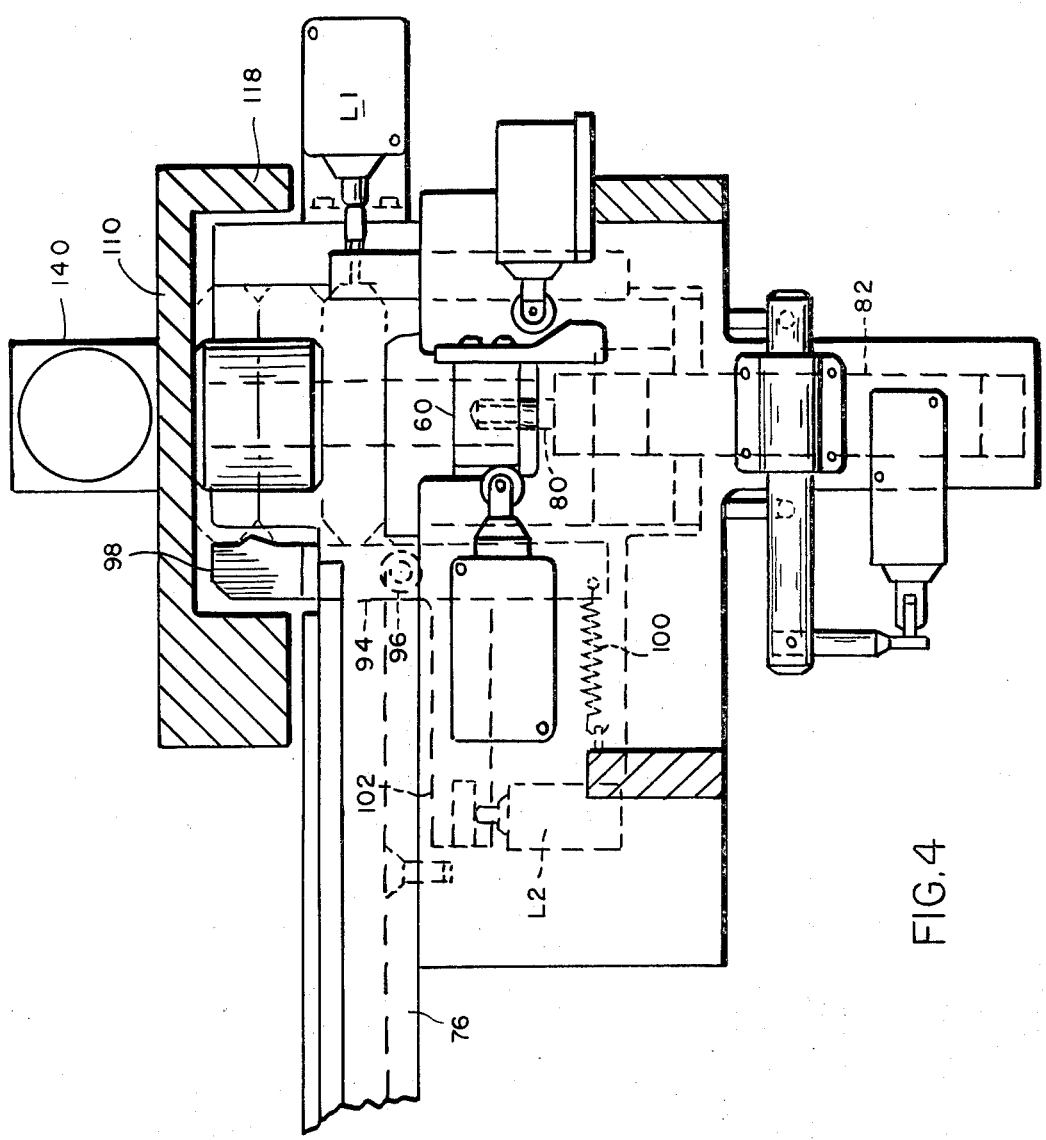
FIG. 4 is a horizontal section taken on the line 4—4 of FIG. 3.

As referred to above, the successive operations are controlled by limit switches. Referring to FIG. 4 the presence of a part on the part support is detected by a limit switch L1 which signals the feed cylinder 82 to advance the part to the picker. At this stage the carriage is in its retracted position which places the picker directly over the part support in a position to receive a part moved forwardly on the part support by the feeder. As soon as the part reaches a position below the picker its presence is detected by a limit switch L2 (FIG. 4) which signals the cylinder 132 to cause the clamp fingers to close on the part and raise the part against the locating members 162—162. Downward movement of the picker linkage to grasp and raise the part into engagement with the locating members is detected by a limit switch L3 (FIG. 5) which signals the cylinder 246 to lower the plunger 242 into the path of the block 248. If a work holder should be damaged, the block is made so as to be readily removable and that work holder would be skipped and not loaded. When the block 248 engages the plunger 242 the carriage 44 moves forwardly in synchronism with the carriage. After moving a predetermined distance, approximately 1⅝ inches, the slide plate and picker having moved far enough to clear the part support, a limit switch L4 (FIG. 7) detects its presence and signals the cylinder 140 to move the slide plate and picker downwardly to press the part into the work holder. If the picker slide completes its downward stroke, a limit switch L5, (FIG. 5) actuated by a cam 121, attached to slide 120, signals the cylinder 132 to cause the picker fingers to release the part, the cylinder 140 to raise the slide plate and picker and the cylinder 268 to move the carriage back to its initial position. The feed cylinder 82 in the meantime has again moved a new part to a position on the part support in readiness to be picked up. The cycle repeats every 2¼ seconds as long as parts continue to be delivered to the pick-up fingers.

Figure 2:
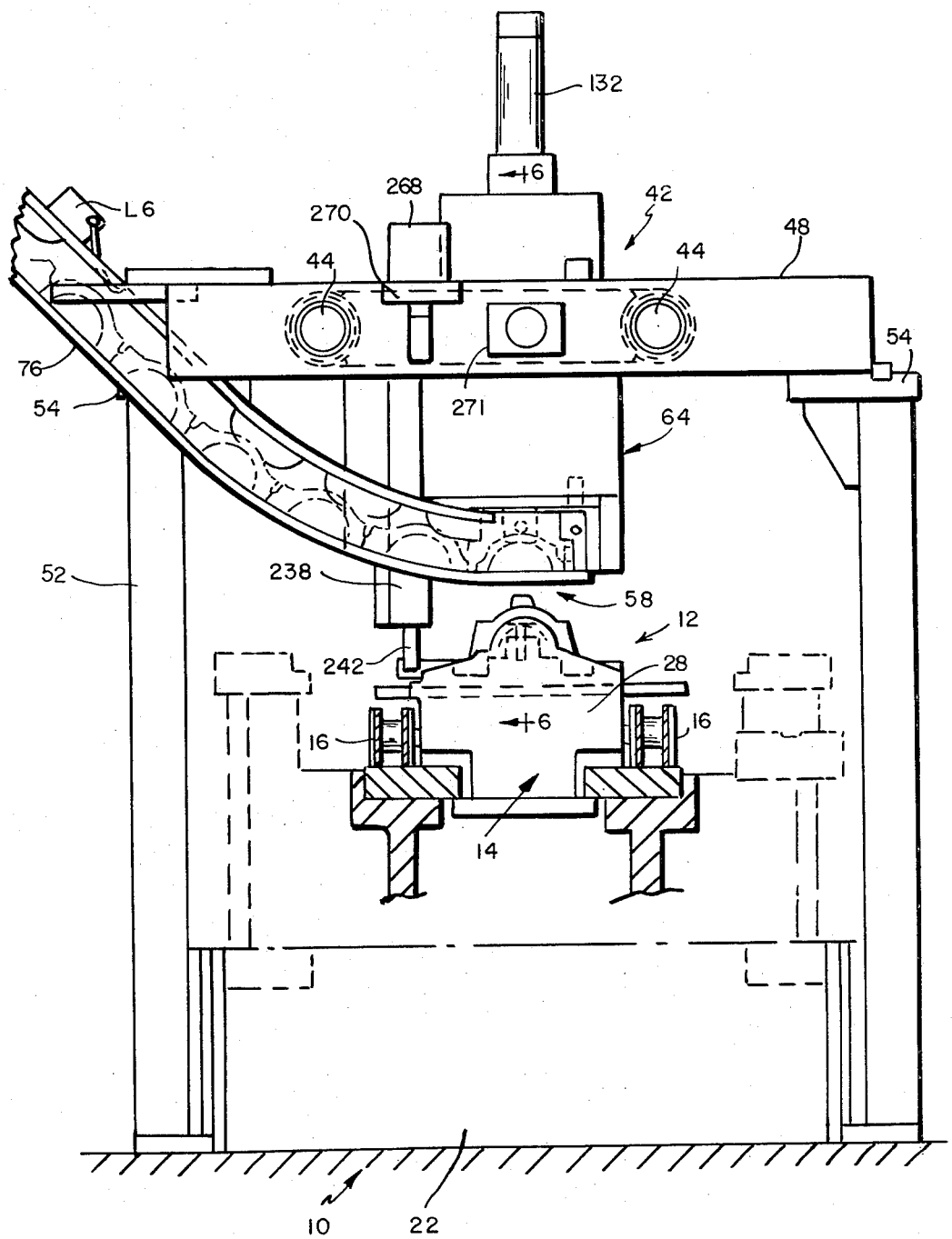
FIG. 2 is an elevation as seen from the left end of FIG. 1 with parts broken away and parts in section.

If there is no part on the part support in a position to be picked up, the cycle is stopped by limit switch L2 and waits until one arrives. The pick-up cylinder 132 remains retracted and as a result the carriage remains stationary in its retracted position. The cycle will also be stopped if the number of parts in the chute falls below a minimum level as detected by a limit switch L6 (FIG. 2). This is necessary in order to provide sufficient thrust from gravity at all times to move parts onto the part support.

One of the important features of the apparatus is that in the case of malfunction the components that can be damaged, locked up or jammed by moving fixtures are readily displaced and may be swung away from the conveyor so as to minimize damage by means of the fact that the frame upon which the loader parts are mounted can be moved upwardly relative to the conveyor by upward pressure applied thereto and that in the event that hand loading is preferred for some reason, the automatic loading instrumentalities may be lifted away from the conveyor without in any way disassembling the component parts thereof.

I claim:

1. A loader for depositing the work pieces into work holders comprising a base frame, a continuous conveyor comprising a plurality of tandemly arranged pivotally connected work holders supported on the frame with a portion thereof in a horizontal plane from movement of said portion in said horizontal plane in a predetermined direction, said work holders being uniformly spaced and each work holder containing a pocket for receiving a work piece to be operated on, a secondary frame means secured to and extending upwardly from the base frame for supporting the secondary frame above and substantially parallel to the conveyor, said means comprising at one end pivot means to which the one end of the secondary frame is pivotally connected and at the other end stationary means on which the other end of the secondary frame rests, a flat horizontally disposed platform secured to the secondary frame, above the conveyor at said other end for receiving work pieces to be inserted into the work holders, tracks mounted on the secondary frame extending forwardly from the platform and in the direction of movement of the conveyor and parallel thereto, a carriage slidingly mounted on the tracks for movement from a retracted position adjacent the platform forwardly along the tracks and beyond the platform in the direction of movement of the conveyor, a plunger mounted on the carriage, said plunger being movable downwardly from a retracted position above the conveyor to an extended position in the path of movement of the work holders on the conveyor, such that forward movement of a work holder will move the carriage forwardly therewith, a plunger motor for extending the plunger to cause the carriage to be moved forwardly with the conveyor and for retracting the plunger at a predetermined distance beyond the platform to release the carriage from the conveyor, a carriage motor connected to the carriage for returning the carriage to its retracted position when released, a slide mounted on the carriage for vertical movement thereon downwardly and upwardly relative to the carriage, a grapple mounted on the slide for vertical movement thereon from a position above the platform upwardly to lift a work piece from the platform and downwardly with the slide to a position to thrust the work piece into the pocket of the work holder with which the plunger is engaged, a grapple motor connected to the grapple to move it upwardly from the platform relative to the slide, and a slide motor connected to the slide for moving it downwardly, said grapple motor and plunger motor being operable at the retracted position of the carriage to cause the grapple to lift a work piece from the platform and to extend the plunger into the path of movement of a work holder on the conveyor, and said slide motor being operable as the carriage is moved forwardly to move the slide and grapple downwardly to insert the work piece into the pocket in the work holder, said grapple motor and said slide motor being operable at the place of release of the carriage from the conveyor to disengage the grapple and raise the slide and said carriage motor being operable following elevation of the slide to return the carriage to its retracted position.

2. Apparatus according to claim 1 comprising an inclined delivery chute having an upper receiving end and a lower discharge end, brackets securing the chute to the secondary frame with its discharge end at the level of the surface of the platform, at one side thereof and rearwardly of the position of the grapple in the retracted position of the carriage, an abutment mounted on the platform opposite the discharge end of the chute in a position such that a workpiece gravitating down the chute will be positioned between the end of the chute and the abutment in line with the grapple, a feeder ram mounted on the platform rearwardly of the chute for movement forwardly on the platform to push a work piece toward the grapple, a ram motor connected to the ram for moving it along the platform in a direction to move the work piece from between the discharge end of the chute and the abutment along the platform and means on the platform adjacent the grapple against which the work piece is moved by said ram to stop the work piece in a position beneath said grapple.

3. Apparatus according to claim 1 comprising a guide member on the platform extending forwardly from the place of discharge to said last means for engagement with a work piece for guiding the work piece as it is moved forwardly by the ram to a position centered with respect to the grapple.

4. Apparatus according to claim 3 comprising a carriage plate suspended from the carriage for angular movement about a horizontal axis, said slide being mounted on the carriage plate, and means releasebly holding the carriage plate in a fixed position perpendicular to the carriage comprising interengaged parts attached to the carriage and carriage plate one of which is yieldably engaged with the other and is disengaged from the other by resistance to movement of the carriage with the conveyor.

5. Apparatus according to claim 3 wherein said interengaged parts have overriding surfaces such as to normally maintain the carriage plate in said perpendicular position relative to the carriage said parts being disengagable by overriding of one relative to the other when the resistance to movement of the carriage exceeds a predetermined amount.

6. Apparatus according to claim 1 wherein each work holder contains an opening which extends longitudinally in the holder into the pocket and an intersecting opening which extends transversely in the holder, a clamp jaw mounted in the longitudinal opening with one end at the entrance to the pocket and the other end in the transverse opening for movement therein to thrust the jaw against a work piece in the pocket, a cam bar mounted in the transverse opening in engagement with the end of the clamp jaw operable by transverse movement to effect movement of the clamp jaw into clamping engagement with a work piece in the pocket said cam bar having an end part extending laterally from the work holder at one side and a cam member on the base frame at that side adjacent the path of movement of the work holders and positioned to be engaged by the laterally extending part of the cam bar and by such engagement to be moved laterally in the transverse opening.

7. Apparatus according to claim 6 wherein said cam bar embodies a part which is projected from the opposite side of the work holder by movement of the bar into clamping position and a cam member on the base frame at that side in a predetermined position beyond the cam member on the one side for engagement with the laterally extending end of the cam bar and by such engagement to move the cam bar to release the clamp jaw.

8. Apparatus according to claim 1 wherein a presser foot is mounted on the secondary frame forwardly of the pivot axis of the secondary frame said presser foot having a downwardly facing convex surface situated just above the path of movement of the work holders for engagement with the tops of such work pieces deposited into the work holders as have not been fully seated to bottom the workpieces in said pockets.

9. Apparatus according to claim 1 comprising means on said other end of the secondary frame extending downwardly toward the path of movement of the work holders but short thereof such that a work piece which fails to be discharged from a work holder and is carried around a full cycle will by engagement with said part lift the secondary frame upwardly away from the conveyor and means of stopping the apparatus in response to lifting of such secondary frame.

* * * * *